(12) United States Patent
Bierhuizen

(10) Patent No.: US 6,499,844 B2
(45) Date of Patent: Dec. 31, 2002

(54) PROJECTION DEVICE AND INTEGRATOR PLATE SUITABLE FOR SUCH A PROJECTION DEVICE

(75) Inventor: Serge Joel Armand Bierhuizen, Wilsonville, OR (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 20 days.

(21) Appl. No.: 09/741,659

(22) Filed: Dec. 19, 2000

(65) Prior Publication Data

US 2001/0035940 A1 Nov. 1, 2001

(30) Foreign Application Priority Data

May 1, 2000 (EP) .............................. 00201560

(51) Int. Cl.[7] ................... G03B 21/14; G03B 21/00; G03B 21/28; G02B 26/00; G02F 1/1335
(52) U.S. Cl. ......................... 353/20; 353/31; 353/34; 353/37; 353/38; 359/237; 359/621; 349/9
(58) Field of Search ........................... 353/20, 31, 33, 353/34, 37, 38; 359/237, 619, 621; 349/8, 9

(56) References Cited

U.S. PATENT DOCUMENTS

| 5,798,866 A | * | 8/1998 | De Vaan | 359/621 |
| 5,900,977 A | | 5/1999 | Hikmet | 359/497 |
| 6,179,425 B1 | * | 1/2001 | De Vaan | 353/38 |
| 6,257,728 B1 | * | 7/2001 | Bergman et al. | 353/31 |

FOREIGN PATENT DOCUMENTS

| EP | 0753780 A1 | 7/1995 | |
| JP | 06289387 | * 10/1994 | G02F/1/1335 |

* cited by examiner

Primary Examiner—Russell Adams
Assistant Examiner—Magda Cruz
(74) Attorney, Agent, or Firm—Dicran Halajian; Frank Keegan

(57) ABSTRACT

A projection device comprising at least one light source, at least one light-modulation panel preceding the light source, and polarization-separating means arranged between said light source and said light-modulation panel for separating light from the light source into first and second light beams having a first and a second direction of polarization, respectively. The projection device also comprises first and second integrator plates comprising lens elements which are arranged between said polarization-separating means and said light-modulation panel, and polarization-converting means arranged opposite the second integrator plate. Each lens element of the second integrator plate includes a first portion on which a first light beam is projected by the first integrator plate, and a juxtaposed, second portion, on which a second light beam is projected. The polarization-converting means are arranged at least opposite said first portions.

9 Claims, 2 Drawing Sheets

PROJECTION DEVICE AND INTEGRATOR PLATE SUITABLE FOR SUCH A PROJECTION DEVICE

FIELD OF THE INVENTION

The invention relates to a projection device comprising at least a light source, at least a light-modulation panel preceding the light source, and a polarization-separating means arranged between the light source and the light-modulation panel for separating light from the light source into first and second light beams having a first and a second direction of polarization, respectively.

The invention also relates to an integrator plate suitable for such a projection device.

BACKGROUND OF THE INVENTION

In such a projection device known from U.S. Pat. No. 5,900,977, the polarization-separating means comprises a refractive filter which passes light having the first direction of polarization and deflects, at an angle, light having a second direction of polarization perpendicular to the first direction.

In the projection device described in said United States patent, the light beams of different directions of polarization are imaged by a polarization rotation layer on a further polarization-separating means and subsequently directed onto the light-modulation panel. A drawback of such a projection device is that the light source is imaged only once on the light-modulation panel so that the light distribution across the light-modulation panel is not uniform.

SUMMARY OF THE INVENTION

It is an object of the invention to provide a projection device in which a uniform light distribution across the light-modulation panel is obtained with a relatively high luminance.

In the projection device according to the invention, this object is achieved in that the projection device further comprises first and second integrator plates comprising lens elements arranged between the polarization-separating means and the light-modulation panel, and polarization-converting means arranged opposite the second integrator plate, each lens element of the second integrator plate having a first portion on which a light beam having the first direction of polarization is imaged by the first integrator plate, and a juxtaposed, second portion on which a second light beam having the second direction of polarization is imaged, the polarization-converting means being arranged at least opposite the first portions.

The light from the light source is split up into two light beams having different directions of polarization by the first integrator plate comprising the polarization-separating means and the lens elements. Subsequently, each lens element of the first integrator plate is imaged on an associated lens element of the second integrator plate. As a result of the different directions at which the light beams having the different directions of polarization reach a lens element of the first integrator plate, the images on the associated lens element of the second integrator plate of the light beams having the different directions of polarization are also different. All light beams imaged on the first portions of the lens elements have, however, the same direction of polarization which is subsequently converted by means of the polarization-converting means into the same direction of polarization as the direction of polarization of the two light beams imaged on the second portions.

The light beam from the light source is imaged one across the other a number of times by the lens elements of the first and second integrator plates, so that a satisfactory light distribution across the light-modulation panel is obtained.

These and other aspects of the invention are apparent from and will be elucidated with reference to the embodiments described hereinafter.

BRIEF DESCRIPTION OF THE DRAWINGS

In the drawings.

In the Figures, corresponding components are denoted by the same reference numerals.

DETAILED DESCRIPTION OF THE PREFERRED EMBODIMENTS

Figure 1:
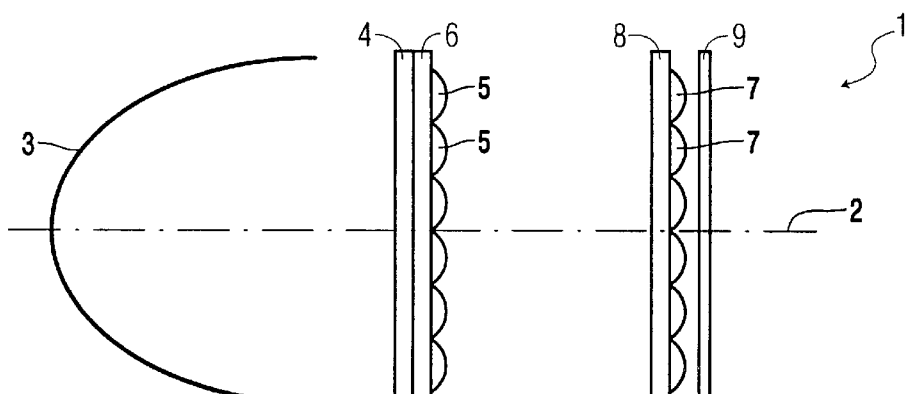
FIG. 1 is a side elevation of a projection device according to the invention.

FIG. 1 shows a projection device 1 according to the invention which, viewed along an optical principal axis 2, consecutively comprises a light source 3, a polarization-separating means 4, a first integrator plate 6 comprising lenses 5, a second integrator plate 8 comprising lenses 7, and polarization-converting means 9. A light-modulation panel (not shown) such as, for example, an LCD is arranged at a side of the polarization-converting means 9 remote from the light source 3.

Figure 2:
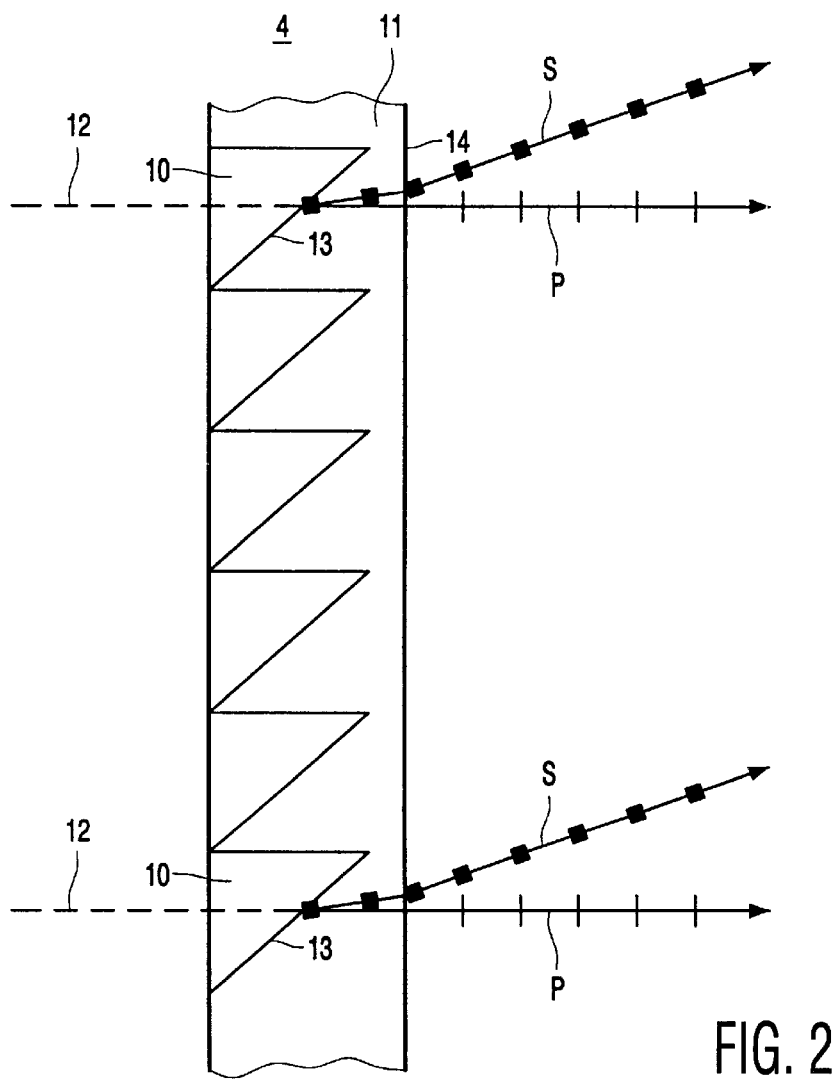
FIG. 2 shows a polarization-separating means of the projection device shown in FIG. 1.
Figure 3:
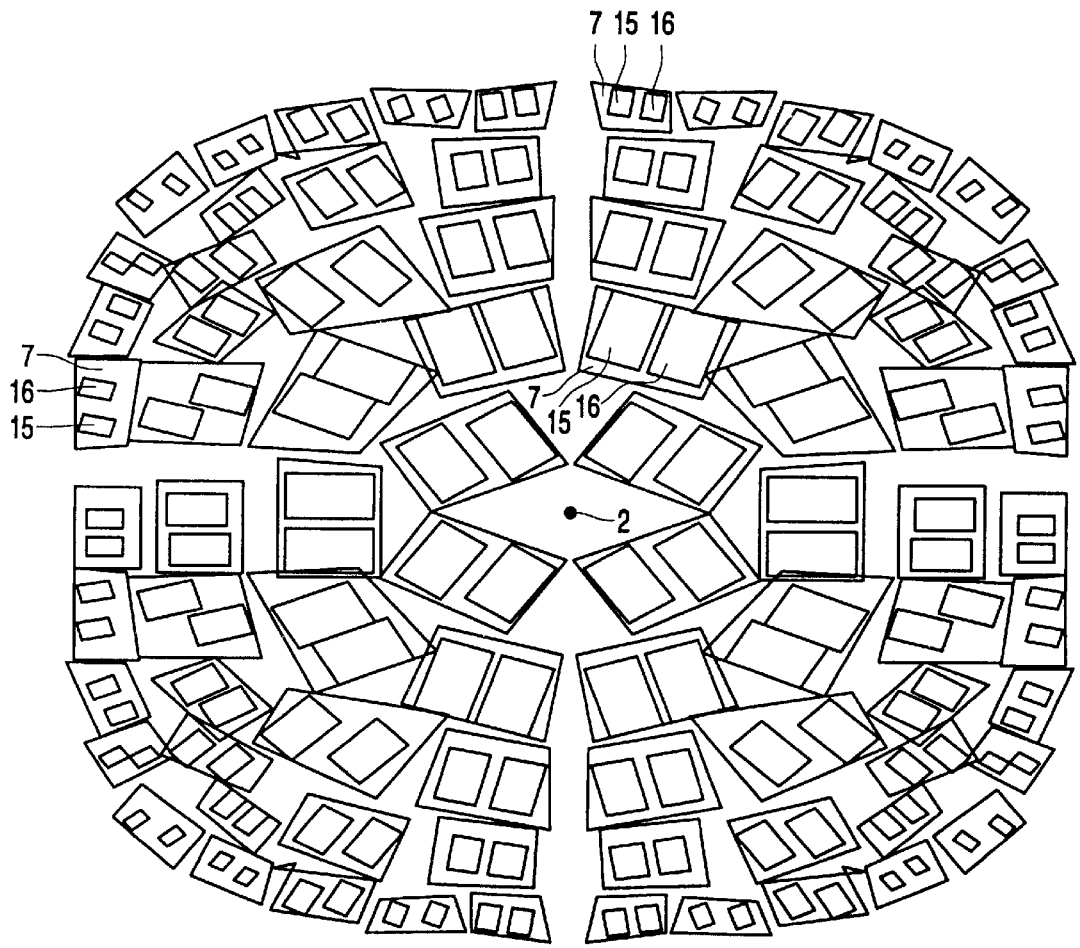
FIG. 3 is a front elevation of a second integrator plate of the projection device shown in FIG. 1 on which light beams having different directions of polarization are imaged.

FIG. 2 shows an embodiment of a polarization-separating means 4 comprising optical elements 10, 11 which are connected together in a sawtooth configuration. The optical elements 11 are made of a birefringent material. A light beam 12 from the light source 3 reaches, via the optical element 10, an interface 13 arranged at an angle. Due to the differences of the refractive indices between different directions of polarization S, P, the light beam having the direction of polarization S is deflected upwards on this interface 13. On leaving the optical element 11, the light beam having the direction of polarization S is deflected once more upwards on the interface 14. The light beam having the direction of polarization P is not deflected on the interface 13 and leaves the polarization-separating means 4 in an undeflected form via the interface 14. All light beams exiting from a single optical element 10 are imaged on a single lens 5 of the first integrator plate 6. The light beams having the directions of polarization S, P are subsequently imaged by this lens element 5 on different portions 15, 16 of a single associated lens element 7 of the second integrator plate 8. Polarization-converting means such as, for example, a polarization rotator having a plurality of birefringent foils are located opposite the portions 15, 16, which polarization-converting means convert the directions of polarization P, S into a single direction of polarization. In this way, all light beams exiting from the integrator plate 8 have the same direction of polarization.

Both the optical elements 10, 11 and the co-operating lens elements 7 are arranged in a pattern corresponding to the desired light distribution.

It is alternatively possible to manufacture the optical elements 10 of a birefringent material.

It is alternatively possible to arrange the polarization-converting means 9 between the integrator plates 6, 8.

What is claimed is:

1. A projection device comprising at least a light source, at least a light-modulation panel preceding the light source, and a polarization-separating means arranged between the light source and the light-modulation panel for separating light from the light source into first light beams and second light beams having a first and a second direction of polarization, respectively, wherein the projection device further comprises first and second integrator plates comprising lens elements, arranged between the polarization-separating means and the light-modulation panel, and polarization-converting means arranged to receive the first and second light beams from the second integrator plate, each one of said lens elements of the second integrator plate having a first portion on which a one of said first light beams is imaged by the first integrator plate, and a juxtaposed, second portion on which a one of said second light beams is imaged, the polarization-converting means receiving, at least, light from the first portions, said light from the light source being transmitted from the polarization converting means to the light-modulation panel and imaged a number of times on the light modulation panel.

2. A projection device as claimed in claim 1, wherein the polarization-separating means comprises a refractive polarization light beam-separating means.

3. An integrator plate suitable for a projection device as claimed in claim 1, wherein the integrator plate comprises a plurality of lens elements of varying size positioned at varying angles with respect to transverse directions in the plane of the integrator plate, each said lens element having first and second portions, and polarization-converting means arranged to receive light from the first portions, while first and second light beams are to be imaged on the first and second portions.

4. A projection device comprising:

a light source, a light-modulation panel receiving projected light from the light source, a polarization-separating means comprising a plurality of optical elements, each of said optical elements separating light from the light source into first and second light beams, each of said first light beams having a first direction of polarization and each said second light beam having a second direction of polarization, said polarization-separating means being arranged between the light source and the light-modulation panel, a first integrator plate comprising a plurality of first integrator plate lenses and a second integrator plate comprising a plurality of second integrator plate lenses, the first integrator plate being between the polarization separating means and the second integrator plate, the second integrator plate being between the fist integrator panel and the light-modulation panel, each said second integrator plate lens having a first portion on which one of said plurality of first light beams is imaged and a juxtaposed, second portion on which one of said plurality of second light beams is imaged, the polarization-converting means being arranged to receive light from at least the first portions, each one of the plurality of said optical elements and the said second integrator plate lens which receives light from said one of the plurality of optical elements being arranged in a pattern, said pattern corresponding to a desired light distribution.

5. The projection device of claim 4 wherein the second integrator plate lenses are of different sizes.

6. The projection device of claim 4 wherein the second integrator plate lenses are positioned at different angles with respect to directions transverse to each other in the plane of the integrator plate.

7. A projection device comprising:

a light source;

a polarization separator having optical elements that separate light from the light source into a first polarized light and a second polarized light;

an integrator plate which receives said first polarized light and said second polarized light, said polarization separator passing said first polarized light without deflection to a first portion of said integrator plate and passing said second polarized light a second portion of said integrator plate with at least two deflections; and a polarization converter which receives light from one of said first portion and second portion.

8. The projection device of claim 7, wherein said polarization converter is located between a light modulation panel and said one of said first portion and second portion.

9. The projection device of claim 7, wherein each of said at least two deflections are less then ninety degrees.

* * * * *